US012625749B2

(12) United States Patent
Deschenes

(10) Patent No.: US 12,625,749 B2
(45) Date of Patent: May 12, 2026

(54) ENERGY FRIENDLY EVENT PROCESSING TASK MODEL

(71) Applicant: Silicon Laboratories Inc., Austin, TX (US)

(72) Inventor: Jean-Francois Deschenes, Ste-Marthe-sur-le-lac (CA)

(73) Assignee: Silicon Laboratories Inc., Austin, TX (US)

( * ) Notice: Subject to any disclaimer, the term of this patent is extended or adjusted under 35 U.S.C. 154(b) by 431 days.

(21) Appl. No.: 18/173,909

(22) Filed: Feb. 24, 2023

(65) Prior Publication Data

US 2024/0289188 A1      Aug. 29, 2024

(51) Int. Cl.
*G06F 9/46* (2006.01)
*G06F 9/48* (2006.01)
*G06F 9/50* (2006.01)
*G06F 9/54* (2006.01)

(52) U.S. Cl.
CPC ............ *G06F 9/542* (2013.01); *G06F 9/4812* (2013.01); *G06F 9/4881* (2013.01); *G06F 9/5016* (2013.01)

(58) Field of Classification Search
CPC .................. G06F 9/45558; G06F 9/452; G06F 2009/45595
See application file for complete search history.

(56) References Cited

U.S. PATENT DOCUMENTS

| | | | | |
|---|---|---|---|---|
| 2007/0260447 A1* | 11/2007 | Canton | ............... | G06F 9/45537 703/27 |
| 2013/0283079 A1* | 10/2013 | Puthiyedath | .......... | G06F 1/3234 713/323 |
| 2015/0277977 A1 | 10/2015 | Vrind et al. | | |
| 2015/0293793 A1 | 10/2015 | Vrind et al. | | |
| 2023/0135214 A1* | 5/2023 | Lahav | ................... | G06F 9/4881 710/260 |

OTHER PUBLICATIONS

Wang et al., Implementing task scheduling and event handling in RTOS+, IEEE, May 2004, pp. 1523-1526. (Year: 2004).*
Burry, R., "Mastering the FreeRTOS™ Real Time Kernel—A Hands-On Tutorial Guide," Real Time Engineers Ltd, 2016, Pre-release 161204 Edition, downloaded from www.FreeRTOS.org on Jan. 11, 2023, 399 pages.

* cited by examiner

*Primary Examiner* — Diem K Cao
(74) *Attorney, Agent, or Firm* — Zagorin Cave LLP

(57) ABSTRACT

An RTOS includes an event processor construct. The event processor has a task priority and an event processor handler. A stack for the event processor is allocated by the RTOS. The event processor handler is called by the RTOS each time an event is posted by an interrupt request handler or another task. Once processing of the event completes, the event processor handler returns (as opposed to remaining in an infinite loop) thereby allowing the stack allocated to the event processor to not be retained on entry into a sleep state and the memory bank containing the stack to be powered down during a sleep state.

15 Claims, 7 Drawing Sheets

```
void bluetooth_init()
{
   // Create a regular task
   RTOS_CreateTask(bluetooth_event_task_handler,    // The function handler
of the task
                   10,                              // The priority of the task
                   stack_memory,                    // The address of the
memory to use for the stack
                   1024); // The size of the stack, in bytes
      // Create an event queue
      RTOS_CreateEventQueue(bluetooth_queue);
}
```

Fig. 2A (Prior Art)

```
void bluetooth_event_task_handler()
{
   while (true) { // Loop forever
      event = RTOS_PendEventQueue(bluetooth_queue);
      // Process the received data as instructed in 'event'. 'event' is the object
that was posted from 'bluetooth_data_received_interrupt_handler()'.
   }
// This function never returns.
}
```

Fig. 2B (Prior Art)

```
void bluetooth_data_received_interrupt_handler()
{
   event = data_received_event;
   RTOS_PostEventQueue(bluetooth_queue, event);
   return;
}
```

| Part 1<br>Event Loop<br>Management | Part 2<br>Event processing |
|---|---|

Top of Stack

Stack Limit

```
void bluetooth_init()
{
   // Create an event processor
   bluetooth_event_processor_id =
RTOS_CreateEventProcessor(bluetooth_event_task_processor_handler, //
The function handler of the event processor
10,                // The priority of the task
1024);             // The size of the stack, in bytes
}
```

Fig. 4A

```
void bluetooth_event_processor_handler(event)
{
      // Process the received data as instructed in 'event'. 'event' is the
object that was posted from bluetooth_data_received_interrupt_handler()'.
      return; // When it is done processing the event, the handler returns.
}
```

Fig. 4B

```
void bluetooth_data_received_interrupt_handler()
{
   event = data_received_event;
   RTOS_PostToEventProcessor(bluetooth_event_processor_id, event);
   return;
}
```

| BANK N | | | | | | |
|---|---|---|---|---|---|---|
| STACK 0 | STACK 1 | STACK 2 | STACK 3 | STACK 4 | ... | STACK N |

602

700

702

704

Part 1
Event Loop
Management

Part 2
Event  processing

Memory Bank A

Memory Bank B

```
void bluetooth_init()
{
   // Create a regular task
   RTOS_CreateTask(bluetooth_event_task_handler,     // The function handler
of the task
                   10,                                // The priority of the task
                   stack_memory1,                     // The address of the
memory to use for the stack in Memory Bank A
                   128); // The size of the stack, in bytes in Memory Bank A
   // Create an event queue
   RTOS_CreateEventQueue(bluetooth_queue);
}
```

Fig. 8A

```
void bluetooth_event_task_handler()
{
   while (true) { // Loop forever
      event = RTOS_PendEventQueue(bluetooth_queue);
      stack_memory2,                    // The address of the memory to
use for the stack in Memory Bank B
      1024); // The size of the stack for processing the event, in bytes in
Memory Bank B
      // Process the received data as instructed in 'event'. 'event' is the object
that was posted from 'bluetooth_data_received_interrupt_handler()'.
   }
// This function never returns.
}
```

Fig. 8B

ENERGY FRIENDLY EVENT PROCESSING TASK MODEL

BACKGROUND

Field of the Invention

This disclosure relates to real time operating systems (RTOS) and in particular to RTOS implementations that achieve greater power savings during sleep states.

Description of the Related Art

Leakage current in static random access memory (SRAM) consumes power even when the SRAM is not being actively used. As memory size increases, the amount of SRAM leakage current also increases. Reducing leakage current from SRAM can save power, which is particularly useful for Internet-of-Things (IOT) applications that have power supplied by battery. One way to save power and reduce leakage current is to shut off parts of memory that are not being used when the device enters a sleep state. It would be desirable to shut off more memory during sleep states to increase power savings, particularly for IOT devices.

SUMMARY OF EMBODIMENTS OF THE INVENTION

Accordingly, in an embodiment a method in a system having a real time operating system (RTOS) includes posting an event to an event processor. In response to the posting, the RTOS calls an event processor handler corresponding to the event and the event processor handler processes the event. After completion of processing the event the event processor handler returns. That allows the stack to not have the need to be retained during sleep states and the memory bank containing the stack allocated for the event processor can be powered down during sleep states.

In another embodiment a system includes a processor and a memory storing a real time operating system (RTOS) for execution by the processor. The RTOS is responsive to an event being posted to an event processor in the RTOS to call an event processor handler corresponding to the event to process the event and the event processor handler is responsive to completion of processing the event to return.

In another embodiment a non-transitory computer-readable medium has instructions embedded thereon that cause a processor to allocate a stack to an event processor in a memory bank. Software, such as an interrupt service routine, posts an event to the event processor responsive to occurrence of a system condition such as a condition indicated by an interrupt. A real time operating system (RTOS) calls an event processor handler corresponding to the event and the event processor handler processes the event and returns responsive to completion of processing the event.

BRIEF DESCRIPTION OF THE DRAWINGS

The present invention may be better understood, and its numerous objects, features, and advantages made apparent to those skilled in the art by referencing the accompanying drawings.

FIG. 2A illustrates pseudo-code for creation of a conventional task.

FIG. 2B illustrates pseudo-code for a conventional task handler.

FIG. 2C illustrates pseudo-code for an interrupt handler that posts an event to a queue.

FIG. 4A illustrates pseudo-code for creation of an event processor.

FIG. 4B illustrates pseudo-code for an event processor handler.

FIG. 4C illustrates pseudo-code for interrupt handler that posts straight to the event processor.

FIG. 8A illustrates pseudo-code for creation of a task according to an embodiment that allocates a first stack for the event loop processing.

FIG. 8B illustrates pseudo-code for a task handler that allocates a second stack for processing the event.

The use of the same reference symbols in different drawings indicates similar or identical items.

DETAILED DESCRIPTION

Figure 1:
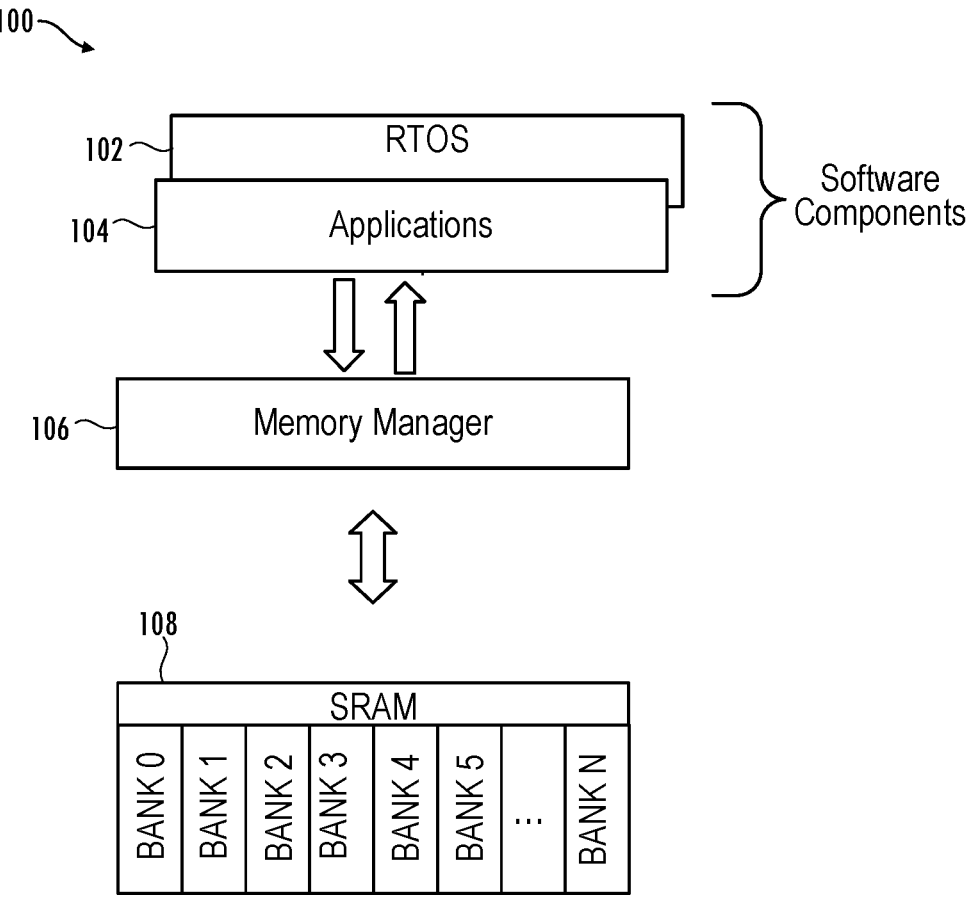
FIG. 1 illustrates a high-level diagram of an embodiment of a system that includes software components including RTOS and application programs, a memory manager, and an SRAM.

FIG. 1 illustrates a high-level diagram of an embodiment of a system 100 that includes software components including RTOS 102 and application programs 104, the memory manager 106, which may operate as a standard memory manager, and the SRAM 108. The SRAM 108 is divided into the various memory banks (BANK 0-BANK N). The term "memory bank" as used herein refers to a block of memory that can be individually powered down during sleep states. The memory manager 104 allocates stacks in the memory banks as described further herein. The software components provide memory requests to the memory manager 106. The software components, including the RTOS and application programs, typically have ten to twenty stacks allocated. The memory manager includes various functions for each aspect of the memory manager including heap, memory protection, and garbage collection and provides an application programming interface (API) for use by application programs to access the functions provided by the memory manager. In an embodiment a heap memory function operates directly with pointers in memory. An allocate function receives the size of memory requested and allocates the requested memory of appropriate size and returns a pointer to it. Thus, programs may use, e.g., standard malloc( ) and free( ) functions found in the C programming language and the memory manager behaves like a standard memory allocator. The deallocate function deallocates the memory previously allocated by a call to the allocate function. The system 100 may be used in prior art systems when a conventional RTOS is used and can be used with embodiments described herein with an RTOS that can provide additional power savings in sleep states.

A typical prior art system uses a real time operating system (RTOS) that employs an event handler model. In such a model, many software modules create tasks (or threads), each of which requires a unique stack. Most of the tasks created use an event handler model. That means that the tasks wait for an event to be posted (from an Interrupt Request Handler (IRQ) or from another task). When the event is posted by the IRQ (or other task), the event handler processes the event and then returns to the point where the task waits for the next event to be posted. The synchronization between the IRQ (or other task) and the event handler is typically implemented using standard RTOS constructs such as semaphore, event flags, and queues.

The stack allocated on the SRAM for a particular task can range from roughly 512 bytes to 5-10 Kbytes. The pseudo-code in FIGS. 2A-2C illustrate a handler task model. FIG. 2A illustrates creation of a conventional task. Assume that the task created in FIG. 2A is for processing a Bluetooth® event such as receipt of data. The initialization of the task creates two objects as shown in the pseudo code in FIG. 2A. First a regular task must be created. Creation of the regular task includes creation of the function handler (also referred to as a task handler), the task priority (shown as 10) and the stack location (stack_memory) that contains the address in the memory to use for the stack. The size of the stack (1024 in the illustrated example) is also specified. Secondly, a synchronization construct (in this case, an event queue) must be created to allow the task to be notified when received data must be processed. Other synchronization constructs can also be used such as semaphores or event flags.

FIG. 2B illustrates the task handler that processes the posted event. In the event handler model, the task handler waits for an event to be posted from an interrupt request handler (IRQ) or another task. The use of the "while (true)" statement results in a task that loops forever waiting for a next event to be posted. When the event is posted, the task handler processes the event and then returns to the point where the task handler waits for the next event in the "while (true)" loop. The handler waits for the next event to be posted using standard RTOS synchronization constructs. The example in FIGS. 2A-2C uses a queue in which the event is posted. Thus, the task handler waits for an event to be posted in the queue (bluetooth_queue), processes the event, and then returns to the point where it pends on the queue using the while (true) statement as shown in FIG. 2B to wait on the next event to be posted.

FIG. 2C illustrates pseudo-code of an interrupt handler that posts the event to the queue. The received data (or other event) cannot be processed within the Interrupt Request (IRQ) handler and instead the IRQ handler posts the event to the task handler shown in FIG. 2B to do the necessary processing. As shown in FIG. 2C, the interrupt handler (or another task) posts a data received event in the bluetooth_queue.

Figure 3:
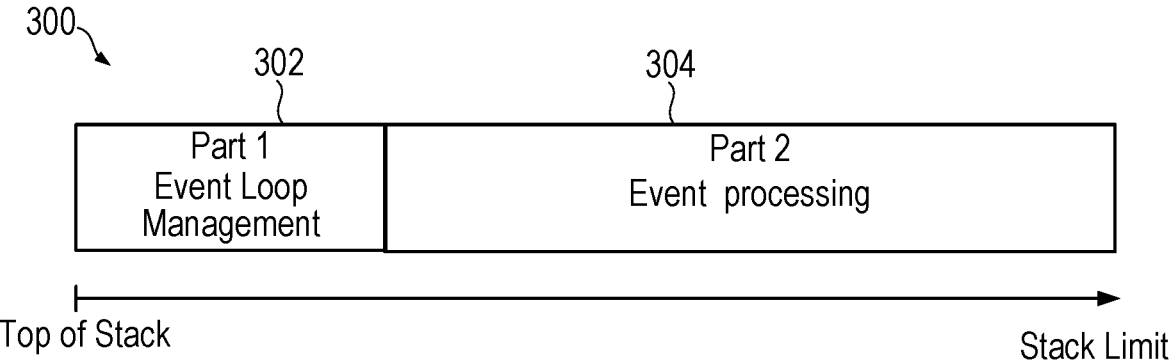
FIG. 3 illustrates a task stack associated with a conventional task.

When using a conventional task, since the conventional task loops forever, the stack allocated in the memory for the regular task needs to be retained during sleep states. FIG. 3 illustrates a task stack 300 associated with a conventional task. The first part of the stack 302 provides event loop management and corresponds to the task handler waiting for an event to be posted. The second part of the stack 304 corresponds to the event processing. Since a device usually does not go into a sleep state while an event is being processed, almost none of the tasks are being processed when the device goes into a sleep state. Instead, at the time of entering a sleep state almost all of the tasks are pending on some basic kernel synchronization construct (most of the time an event flag, queue, or semaphore) to process an asynchronous event. Note that some tasks also process synchronous (time based) events. So for the task stack 300, the event loop management portion 302 is always there and always used. However, the event processing part 304 is only used when an event is being processed. Since, the system does not generally enter a sleep state when an event is being processed, most of the time the event processing portion 304 of the stack is not performing a useful function at the time the system is entering a sleep state. That means that all (or at least the vast majority) of the tasks will always be waiting for an event to be posted when the system enters a sleep state. Note that while a system may have multiple sleep states, "sleep state" as used herein refers to a state in which one or more memory banks can be turned off to save power in the sleep state.

It would be advantageous for IoT (and other) devices to limit the quantity of SRAM retained when entering a sleep state because it would reduce power consumption in sleep states thereby extending battery life. Accordingly, a new task model is described herein that does not require the stack to be retained and suits the needs of a significant portion of the tasks. Embodiments described herein create a new task model that will only be able to do event processing. Having the RTOS fully in control of the event processing enables the RTOS to control retention needs on the stack.

To use as few memory banks as possible, memory allocations should cluster close together to reduce the number of banks being used. In that way, as a device prepares to enter a sleep state, as many memory banks as possible can be powered off to save power. Thus, the RTOS should allocate stacks for the new task model contiguously (as much as possible) in a bank or banks that can be powered down.

The goal is to remove the need to retain the SRAM used in stacks that have been traditionally allocated for conventional tasks. As SRAM utilization grows and longer battery life is desirable, the new task model can help reduce the amount of SRAM retained when entering the sleep state. Referring again to FIG. 3, the portion 304 of the stack does not need to be retained when entering the sleep state unless the task is currently processing an event. In an ideal world, the system could turn off retention of just a portion of the stack (portion 304) but unless the event processing portion 304 happens to cover an entire bank of SRAM, it is not possible to turn off SRAM memory with such a level of granularity. The new task model described herein for asynchronous event handling increases the opportunity to decrease RAM retention in the sleep state.

Accordingly, the RTOS includes a new construct that increases the opportunity to power down SRAM banks by decreasing SRAM retention needs. This new construct is referred to herein as an event processor. The event processor has a lot of similarities with a conventional task described in FIGS. 2A and 2B but with important differences. A "task" priority still has to be specified. A stack has to be allocated and associated with each event processor. An event processor handler still has to be implemented. The event processor is scheduled just like a regular task. In an application where there is a mix of regular tasks and event processors, in embodiments both are treated equally by the scheduler. Of course, the task priority can determine how the scheduler treats a particular task and the task priorities for the event processors and the regular tasks depend on a particular application in which the RTOS is being used. The main difference between the event processor and a regular task is that the handler specified for the event processor is very different than a conventional task handler. As shown in FIG. 2B, the conventional task handler is normally implemented as an infinite loop (using the while (true) statement) and the conventional task handler never returns. In contrast, the event processor handler is called each time an event is posted, and only treats the received event. Once processing of the received event completes, the event processor handler returns (as opposed to remaining in an infinite loop) thereby allowing the stack allocated to the event processor to not be retained on entry into a sleep state. That is equivalent in memory size to allowing the event processing portion of stack shown in FIG. 3 to be powered down during a sleep state. Where tens of such stacks are present in a particular application, that can result in significant power savings. That also provides incentives to ensure that the RTOS, in conjunction with the memory manager, allocates the stacks associated with the event processors contiguously as much as possible.

To illustrate the new RTOS construct at a high level consider the event processor as a task that is created each time that an event is posted and deleted each time the event processing is completed. During the processing of an event, the event processor handler behaves just like a regular task. That means the event processor handler can use operating system constructs (semaphore, mutex, etc.) and can be pre-empted by the scheduler. That also means resource protection should be considered just like in a regular task. The benefit provided is the ability to control the needs for retention of the event processor stacks. Given that most of the time the system will not enter a sleep state in the middle of the processing of an event, it is possible to avoid the necessity of retention for the event processor stacks. The stacks are automatically allocated by the event processor at creation with help from the memory manager. That way embodiments can ensure that all the event processor stacks are contiguous to the extent possible and that they are located in a memory bank (or banks) that normally do not contain data needed to be retained in a sleep state.

FIGS. 4A-4C show pseudo code illustrating the use of an event processor instead of a conventional task such as shown in FIGS. 2A-2C. At initialization, the creation of an event processor as shown in the pseudo-code of FIG. 4A is very similar to a regular task creation with the only difference being that no stack memory location is specified as the stack memory is allocated by the RTOS. The size of the stack (1024 Kbytes) is specified but not the specific memory location as in the conventional task of FIG. 2A. That allows the RTOS to efficiently allocate the stack with retention (or lack thereof) in mind. The priority of the task (10 in the example of FIG. 4A) is also specified. However, note that there is no creation of an event queue or another synchronization object. A synchronization object is not necessary in this event processor model because the event processor handler does not pend in an infinite loop on a queue or other synchronization object. Instead of creating a regular task via a task application programming interface (API), the user creates an event processor in the RTOS using an event processor API.

The event processor handler that processes the posted events shown in FIG. 4B differs significantly from the conventional task handler. The event processor handler is called by the RTOS when an event is posted to the event processor. The event to process is passed as an argument to the event processor handler. The event processor handler processes the received data (again assuming the event is Bluetooth data received) as instructed in the "event" that was posted from the interrupt handler. The "event" is the object that was posted from the interrupt handler. The received data may be instructing the IOT device to perform a function, may be related to configuration of the IOT device, or may be for another purpose. The event processor handler always returns when it is done processing the event. Since the event processor handler returns rather than running in an infinite loop, there is no need to retain the stack associated with the event processor when the event processor handler has completed its processing.

FIG. 4C illustrates the interrupt handler (or other task) that posts straight to the event processor. The event shown in FIG. 4C is a data_received_event. The interrupt handler then posts the event to the event processor (Bluetooth_event_processor_id) when an interrupt corresponding to the Bluetooth event occurs.

Figures 5, 6:
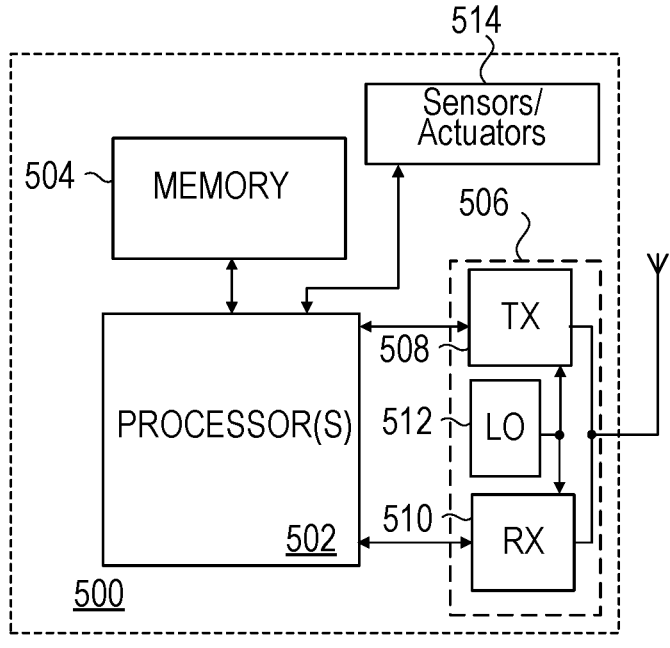
FIG. 5 illustrates a high level block diagram of an IOT system that incorporates an embodiment of the RTOS that achieve greater power savings during sleep states.
FIG. 6 illustrates a memory bank with contiguous event processor stacks.

FIG. 5 illustrates a high level block diagram of an IOT system implemented on an integrated circuit 500 that utilizes an RTOS as described herein to achieve greater power savings during sleep states. The integrated circuit 500 includes at least one processor 502 and associated memory 504. The memory 504 includes memory for the RTOS and other software components and memory for the event processor stacks and for other functionality required by the system. The memory 504 includes SRAM and may further include non-volatile memory (NVM) as well as dynamic RAM according to the particular application in which the integrated circuit operates. In an embodiment, the system includes a wireless block 506 that includes analog logic to communicate using one or more wireless protocols such as Wi-Fi®, Bluetooth®, Zigbee™, or other short range or long range wireless protocol. The wireless block includes transmission circuits 508, receive circuits 510 and a local oscillator 512. The integrated circuit includes sensors/actuators and analog to digital converters (ADC) and/or digital to analog converter (DAC) circuits 514 to convert sensed data into digital information that can be used by the processor 502 and/or transmitted as needed or to convert commands received by the wireless interface to take an action, e.g., turn on/off home equipment. In an embodiment the integrated circuit 500 performs applications used in Internet of Things (IoT) applications, e.g., home applications such as appliances, lighting control, remote sensing such as water meters, automotive applications, and retail applications. The integrated circuit 500 is powered by a battery (not shown) and periodically wakes up to supply or receive data over the wireless block 506. While in a sleep state, the memory allocation provided by the event processor construct in integrated circuit 500 allows greater power savings in sleep states by shutting down more memory banks in memory 504.

FIG. 6 illustrates an example of a memory bank 602 with N event processor stacks (or other memory allocation not requiring retention during sleep states). The memory bank does not need to be completely filled with event processor stacks (or completely filled with other data that does not need retention). The only criteria is that all the data stored in the memory bank does not need to be retained when entering a sleep state and the bank can be powered down for power savings. The event processor approach described herein provides greater opportunity for powering down memory banks during a sleep state, thereby providing greater power savings due to reduced SRAM leakage current during sleep states. In an embodiment, stacks can be shared between two event processors that are known to be mutually exclusive to reduce the amount of memory allocated for the stacks. Note that while embodiments described herein achieve power savings associated with the ability to shut down more SRAM during a sleep state, there is some power cost in having to create the event processors and allocate associated stacks when the system wakes up from the sleep state. The longer the sleep state lasts, the more power savings is achieved.

It is noted that the functional blocks, devices, and/or circuitry described herein can be implemented using various combinations of analog circuits, digital circuits, and programmable circuits such as software programmed on microcontroller unit (MCU) or other processor to provide the functionality described herein. It is further noted that the software or other programming instructions can be stored in one or more non-transitory computer-readable mediums (e.g., SRAM, DRAM, non-volatile memory, etc.), and the software or other programming instructions when executed by the programmable integrated circuits cause the programmable integrated circuits to perform at least some of the processes, functions, and/or capabilities described herein.

Figure 7:
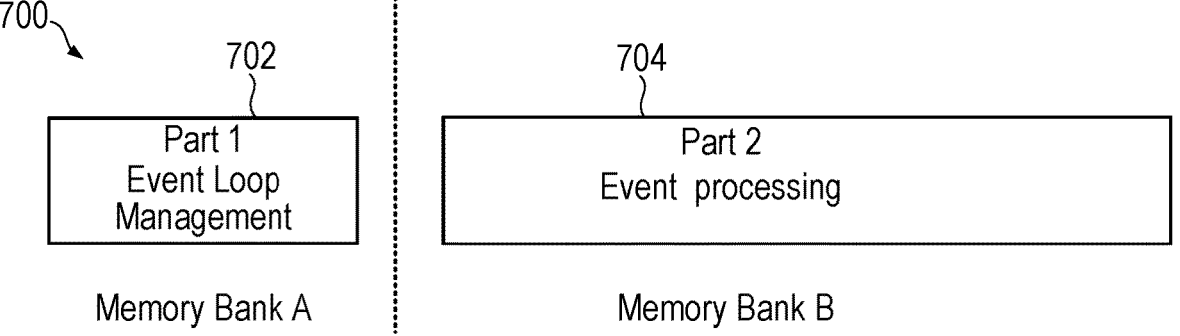
FIG. 7 illustrates two task stacks associated with a task model according to an embodiment.

In another embodiment, SRAM retention improvement can still be achieved using a modified regular task. Referring to FIG. 7, rather than implement a single stack 300 (see FIG. 3) that needs to be retained during sleep states, the part 1 portion of the stack for event loop management (302 in FIG. 3) and the part 2 portion of the stack used for event processing (304 in FIG. 3) are implemented as two different and non-contiguous stacks 702 and 704 in different memory banks (Memory Bank A and Memory Bank B). The stack 702 used for the event loop management is fairly small and is always retained in sleep states while the stack 704 does not need to be retained. Referring to FIG. 8A, the pseudo code illustrating the embodiment allocates the first portion of the split stack at a first address (stack_memory1) that will be retained. When an event needs to be processed, the pseudocode allocates the stack 704 right after the line of code, event=RTOS_PendEventQueue(bluetooth_queue);

for the event processing portion of the stack in a memory bank that is not retained during sleep states. The processing switches to the newly allocated stack 704 and processes the event, e.g., data to be sent or received by an IOT device. Once the event is processed, the stack being used switches back to the part 1 stack 702 and the part 2 stack 704 can be freed thereby allowing the memory used for the part 2 stack to be deallocated. That allows the memory bank containing the part 2 stack (but not the part 1 stack) to be powered down during a sleep state. While not as efficient as the embodiment illustrated by the pseudo-code of FIGS. 4A and 4B, a significant amount of memory (stack 704) is removed from retention in sleep states using the task model shown in FIGS. 7, 8A, and 8B. Note that the allocations of 128 bytes and 1024 bytes for the stacks are exemplary and the size of the split stacks depends on the particular task being implemented. Further note that the system represented in FIG. 5 can utilize the embodiment described in FIGS. 7, 7B, 8A, and 8B.

Thus, in another embodiment a method in a system having a real time operating system includes allocating a first stack for event loop management for a task in a first memory location during creation of the task and responsive to an event being posted in a synchronization construct, allocating a second stack for event processing in a second memory location that is non-contiguous with the first memory location. The event is processed using the second stack and after processing the event the system switches back to using the first stack thereby allowing the second stack to be freed. The method may further include allocating the first stack in a first memory bank and the second stack in a second memory bank. The method may further include powering down memory containing the second stack responsive to a decision to enter a sleep state.

Further modifications and alternative embodiments of this invention will be apparent to those skilled in the art in view of this description. It will be recognized, therefore, that the present invention is not limited by these example arrangements. Accordingly, this description is to be construed as illustrative only and is for the purpose of teaching those skilled in the art the manner of carrying out the invention. It is to be understood that the forms of the invention herein shown and described are to be taken as the presently preferred embodiments. Various changes may be made in the implementations and architectures. For example, equivalent elements may be substituted for those illustrated and described herein, and certain features of the invention may be utilized independently of the use of other features, all as would be apparent to one skilled in the art after having the benefit of this description of the invention.

What is claimed is:

1. A method in a system having a real time operating system (RTOS) comprising:
   creating an event processor when the system wakes up from a sleep state, the event processor including a priority and a stack size but without a memory address and without a synchronization object;
   allocating an event processor stack in a memory bank for the event processor;
   posting an event to the event processor;
   calling an event processor handler corresponding to the event;
   processing the event in the event processor handler;
   returning from the event processor handler responsive to completion of processing the event;
   responsive to a decision to enter another sleep state, turning off the memory bank containing the event processor stack; and
   upon waking up from the other sleep state again creating the event processor.

2. The method as recited in claim 1, further comprising an interrupt handler posting the event to the event processor.

3. The method as recited in claim 1, further comprising passing the event as an argument to the event processor handler.

4. The method as recited in claim 1, further comprising a scheduler in the RTOS scheduling the event processor to execute once responsive to the event being posted to the event processor.

5. The method as recited in claim 1, further comprising prior to entering the other sleep state allocating another event processor stack for another event processor, the other event processor stack being contiguous with the event processor stack in the memory bank.

6. The method as recited in claim 1, further comprising allocating a plurality of event processor stacks for a plurality of event processors, including the event processor, in one or more memory banks and turning off the one or more memory banks responsive to entering a sleep state.

7. A system comprising:
   a processor;
   a memory storing a real time operating system (RTOS) for execution by the processor;
   an event processor created after waking up from a sleep state, the event processor including a priority and a stack size but not including a memory address or a synchronization object;
   a memory manager to allocate a stack in a memory bank in conjunction with the RTOS, the stack being associated with the event processor;
   wherein the RTOS is responsive to an event being posted to the event processor to call an event processor handler corresponding to the event to process the event;

wherein the event processor handler is responsive to completion of processing the event to return;

wherein responsive to a decision to enter another sleep state, memory containing the stack associated with the event processor is turned off; and wherein the event processor is created again upon waking up from the other sleep state.

8. The system as recited in claim 7, further comprising an interrupt handler responsive to an interrupt to post the event to the event processor.

9. The system as recited in claim 7 wherein the event is passed as an argument to the event processor handler.

10. The system as recited in claim 7 further comprising a scheduler in the RTOS to schedule the event processor to execute once responsive to the event being posted to the event processor.

11. The system as recited in claim 7, wherein the RTOS in conjunction with the memory manager allocates a plurality of event processor stacks for a plurality of event processors, including the event processor stack, in the memory bank and the memory bank is turned off responsive to a decision to enter a sleep state.

12. The system as recited in claim 7 wherein the RTOS gives equal priority to the event processor and another task.

13. The system as recited in claim 7, wherein the stack is shared between the event processor and another event processor that is mutually exclusive with the event processor.

14. A non-transitory computer-readable medium having instructions embedded thereon, wherein the instructions, when performed on a processor, cause a processor to:

create an event processor when the processor wakes up from a sleep state, the event processor including a priority and a stack size but not including a memory address or a synchronization object;

allocate a stack processor in a memory bank to the event processor;

post an event to the event processor responsive to an occurrence of a system condition, the event processor being part of a real time operating system (RTOS);

call an event processor handler, the event processor handler corresponding to the event;

process the event in the event processor handler;

return from the event processor handler responsive to completion of processing the event; and cause the memory bank to power down responsive to a decision to enter another sleep state.

15. The non-transitory computer-readable medium as recited in claim 14, further comprising an interrupt handler to post the event to the event processor responsive to the occurrence of the system condition.

\* \* \* \* \*